United States Patent
Wu

(10) Patent No.: US 8,275,999 B2
(45) Date of Patent: Sep. 25, 2012

(54) METHODS FOR PROVIDING POWER TO AN INFORMATION HANDLING SYSTEM UPON RECEIVING A HOT PLUG DETECT SIGNAL FROM A VIDEO DISPLAY

(75) Inventor: Shuguang Wu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 12/547,470

(22) Filed: Aug. 25, 2009

(65) Prior Publication Data

US 2011/0055594 A1    Mar. 3, 2011

(51) Int. Cl.
*G06F 1/00* (2006.01)
*G06F 1/32* (2006.01)

(52) U.S. Cl. .................. 713/300; 713/310; 713/320

(58) Field of Classification Search .................. 713/300
See application file for complete search history.

(56) References Cited

U.S. PATENT DOCUMENTS

| | | | |
|---|---|---|---|
| 5,764,547 A | 6/1998 | Bilich et al. | |
| 6,125,449 A * | 9/2000 | Taylor et al. ................. | 713/310 |
| 7,219,240 B2 * | 5/2007 | O .................................. | 713/300 |
| 7,664,975 B2 * | 2/2010 | Oh et al. ........................ | 713/320 |
| 7,743,264 B2 * | 6/2010 | Brown et al. ................. | 713/300 |
| 2009/0094386 A1 * | 4/2009 | Wang et al. ................... | 710/10 |

* cited by examiner

*Primary Examiner* — Suresh Suryawanshi
(74) *Attorney, Agent, or Firm* — Baker Botts L.L.P.

(57) ABSTRACT

A method for powering on an information handling system (IHS) includes receiving a power request signal from a video display in communication with the IHS. The methods further includes determining that the power request signal is a response to a power-on signal for the video display, and powering on the IHS by sending the power-on signal to a power controller of the IHS.

20 Claims, 4 Drawing Sheets

METHODS FOR PROVIDING POWER TO AN INFORMATION HANDLING SYSTEM UPON RECEIVING A HOT PLUG DETECT SIGNAL FROM A VIDEO DISPLAY

TECHNICAL FIELD

The present disclosure relates generally to the field of information handling systems, and, more specifically, to providing power to information handling systems.

BACKGROUND

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some IHSs, a display device may be desired to output visual data generated within an IHS. For example, a user may desire to play a movie, play a game, or engage in any other activity that requires visual output. Thus, a display for an IHS may be designed to convert digital data from the IHS into a visual form viewable by a user.

Certain challenges may exist in designing an IHS-display pairing that offers energy savings and ergonomic comfort. Current trends encourage energy savings for budgetary and regulatory concerns. As such, users typically power off their IHSs, or place the IHSs in a standby or hibernation mode when finished using the IHS for a task. However, users typically place the IHS below a desktop, with the display located on top of the desktop. The user can typically power off the IHS using software on the IHS, and as such, may turn off the IHS without having to reach the power button on the IHS.

However, when turning the IHS back on, the user may be required to press the power button on the IHS. Because the power button for the IHS is typically on the IHS, the user may need to bend down to turn the power on. This typical design, by placing stress on the user's back, may not be ergonomic.

Techniques have been developed to enable the user to power on, and off, peripheral devices, which may be remotely located from the IHS. However, these techniques do not enable the user to power on the IHS remotely. Further, these techniques may require the user to reach the power button on the IHS, which typically, is not ergonomically located for the user.

One alternative uses a proprietary cable for powering on the IHS from the display device. However, the proprietary cable may require proprietary hardware on the IHS, and may not be compatible with the display interface for the typical IHS. Thus, a need exists for an ergonomic solution that enables the typical user to provide power to the IHS.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for providing power to an information handling system (IHS). The method may include receiving a power request signal from a video display in communication with the IHS and determining that the power request signal is a response to a power-on signal for the video display. The method further includes powering on the IHS by sending a power-on signal to a power controller of the IHS.

Another aspect of the disclosure provides for an information handling system (IHS). The IHS may include a video display adapter and a power switch, wherein the video display adapter may be in communication with the IHS. The power switch may be used to provide power to the IHS. The power switch may further be operable to receive a power request signal from the video display. The power switch may be further operable to determine that the power request signal is a response to a power-on signal for the video display. Moreover, the power switch may be operable to power on the IHS by sending the power-on signal to a power controller of the IHS.

Another aspect of the disclosure provides for a method for providing power to an IHS. The method may include powering on a video display in communication with the IHS, wherein the IHS is in a power state of S3, S4, or S5. The method may including generating and sending a power request signal to a graphics adapter of the IHS. The method further includes receiving the power request signal from the video display and determining that the power request signal is a response to a power-on signal for the video display. Further, the method includes powering on the IHS by sending a power-on signal to a power controller of the IHS.

Another aspect of the disclosure provides for a computer-readable storage medium containing program instructions executable by a processor to execute a method for powering on an information handling system (IHS). The method includes receiving a power request signal from the video display and determining that the power request signal is a response to a power-on signal for a video display in communication with the IHS. The method further includes powering on the IHS by sending a power-on signal to a power controller of the IHS.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems and methods are described, it is to be understood that this disclosure is not limited to the particular systems, methods and media described, as such may vary. Also, the present disclosure is not limited in its application to the details of construction, arrangement or order of components and/or steps set forth in the following description or illustrated in the figures. Thus, the disclosure is capable of other aspects, embodiments or implementations or being carried out/practiced in various other ways.

One of ordinary skill in the art should understand that the terminology used herein is for the purpose of describing possible aspects, embodiments and/or implementations only, and is not intended to limit the scope of the present disclosure which will be limited only by the appended claims. Further, use of terms such as "including", "comprising", "having", "containing", "involving", "consisting", and variations thereof are meant to encompass the listed thereafter and equivalents thereof as well as additional items.

It must also be noted that as used herein and in the appended claims, the singular forms "a," "and," and "the" may include plural referents unless the context clearly dictates otherwise. Thus, for example, reference to "a device" refers to one or several devices and reference to "a method of monitoring" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
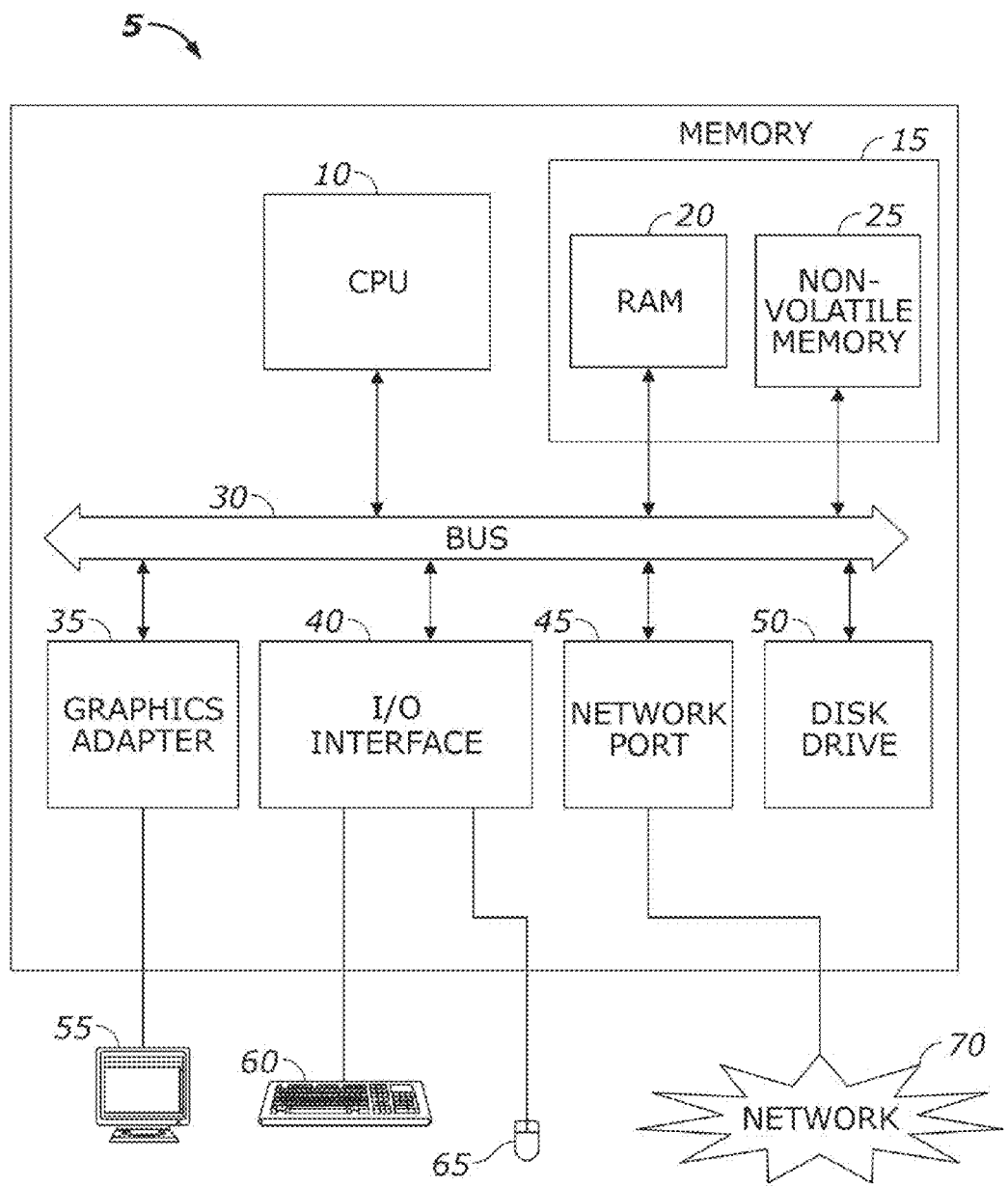
FIG. 1 represents a schematic of an information handling system (IHS) in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic/input output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as graphics adapters 35, disk drives port 50, and input/output interfaces 40 (e.g., keyboard 60, mouse 65).

Figure 2:
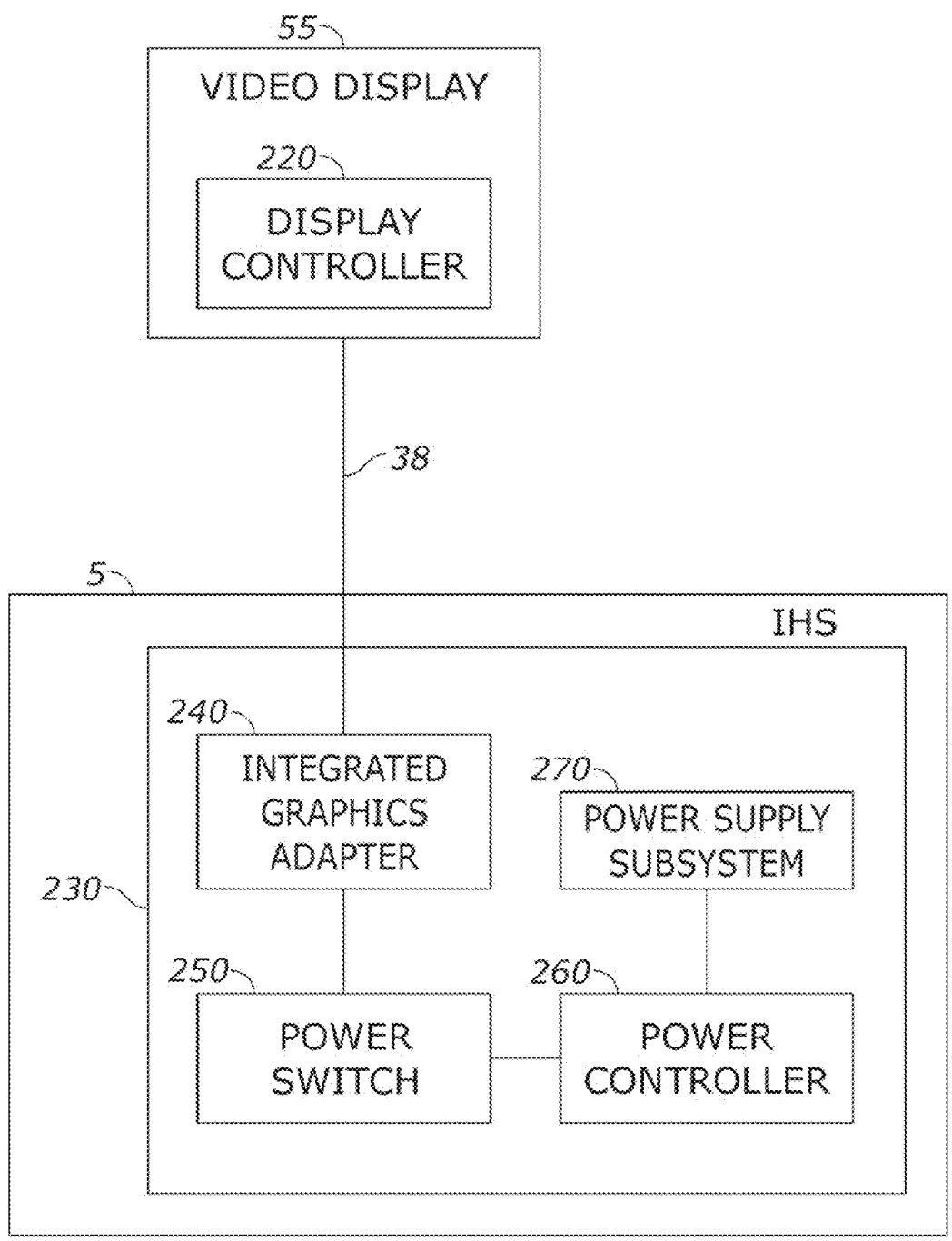
FIG. 2 represents a system for powering on the IHS in accordance with one aspect of the present disclosure.

FIG. 2 represents a system for powering on the IHS 5 in accordance with one aspect of the present disclosure. The system includes the video display 55 (e.g., monitor) and the IHS 5, described with reference to FIG. 1. The video display 55 includes a display controller 220. When the video display 55 is powered on, the display controller 220 may send a power request signal to the IHS 5. In one implementation, the power request signal may be carried on a hot plug detect (HPD) wire within the display cable 38. The HPD signal wiring may be typically found in conventional digital display interfaces, such as DisplayPort, Digital Visual Interface (DVI), and High-Definition Multimedia Interface (HDMI). Note that the present disclosure is in no way limited to using a specific signal such as HPD and as such can be applied to more generic power request signals, other standard interface and cable wiring, or other implementations. The HPD signal may indicate to the IHS 5 that the video display 55 is coupled to the IHS 5 and that the video display 55 is powered on. Typically, the HPD signal may in the form of a pulse with duration of 0.5-1.0 millisecond. However this invention is in no way limited to particular signal types, shapes, duration, or the like.

The IHS 5 may include a motherboard 230, which typically contains the components within the IHS 5 that are described with reference to FIG. 1. Additionally, the motherboard 230 may include an integrated graphics adapter 240, a power switch 250 and a power controller 260. In one implementation, the integrated graphics adapter 240 may substitute for the graphics adapter 35 described with reference to FIG. 1. It should be understood that although in one implementation, a graphics adapter may be integrated within the motherboard of the IHS 5, other configurations of graphics adapter may also apply, such as with discreet or add-on graphics adapter, as will be described below.

The integrated graphics adapter 240 may provide an interface between the video display 55 and the IHS 5. The integrated graphics adapter 240 may generate and output images to the video display 55. Additionally, the integrated graphics adapter 240 may determine when the video display 55 is powered on. In one implementation, the integrated graphics adapter 240 may receive a power request signal (e.g., HPD signal) when the video display 55 is powered on. In response, the integrated graphics adapter 240 may send a power-on signal to the power switch 250. The power-on signal may be in the form of an edge or level triggered logic signal or a command comprised of a series of logic signals.

The power switch 250 may receive power-on signals, such as power-on or power-off requests, for the IHS 5. As such, the power switch 250 may forward the power-on/off requests to the power controller 260. The power controller 260 may control various power states of the IHS 5.

The power states, ranging from S0 to S5, may represent different states of power consumption for the IHS 5. For example, the S0 state may represent an "on" state, whereby the IHS 5 is operational. States S1-S4 may represent various "sleeping" states (e.g., standby, hibernation, etc.) and the S5 state may represent an "off" state.

In the S1 state, all processor caches may be flushed, and the CPU 10 may stop executing instructions. Other devices may also be powered down in the S1 state. However, power to the CPU 10 and RAM 20 may be maintained during the S1 state.

In the S2 state, the CPU 10 may be powered off. The S3 state may commonly be referred to as Standby. In the S3 state, the RAM 20 may still be powered on. The S4 state is commonly referred to as hibernation or standby state. In the S4 state, the memory 15 may be powered down. As such, all content of the memory 15 may be saved to non-volatile memory such as the hard disk drive 50, for example, before the memory 15 is powered down. In a typical IHS, at least one type of standby power may be provided even in the off (S5) state in order to provide necessary functions, for example, to power the power switch and power controller described in the present disclosure.

In response to receiving a power-on signal, the power switch 250 may request that the power controller 260 change the power state. The detection of the power on signal depends on the type of such request and may be implementation specific. Accordingly, the power controller 260 may change the power state. As such, the power controller 260 may change the power state to S0 in response to a power-on signal from the integrated graphics adapter 240. In one of the possible implementations, the power switch 250 and power controller 260 reside in an ICH (I/O Controller Hub), which may reside between the different power control sources and the power supply subsystem 270. When the power-on signal is detected and passed on to the power switch 250 inside the ICH, the power controller 260 inside the ICH asserts the "Power On" signal to the power supply subsystem 270 which in turn switches on the different DC power voltage rails in IHS 5. The power controller 260 waits for the power supply subsystem 270 to assert a "Power Good" signal, indicating the DC power is on and ready for the IHS 5 to change its power state.

Figure 3:
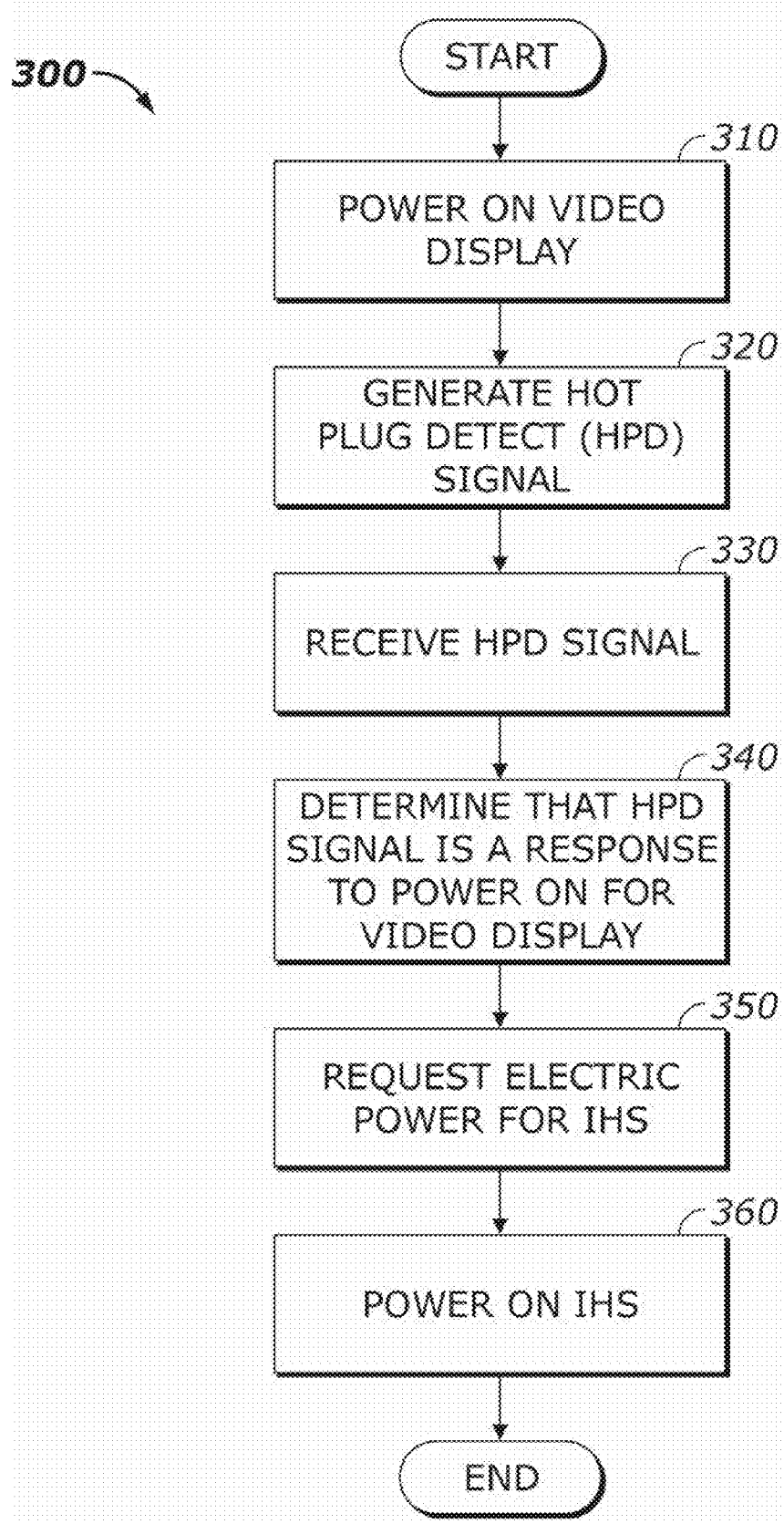
FIG. 3 provides a flow diagram of a method for powering on the IHS in accordance with one aspect of the present disclosure.

FIG. 3 provides a flow diagram of a method 300 for powering on the IHS 5 in accordance with another aspect of the present disclosure. In particular, the method 300 may be directed towards the IHS 5 in communication with the video display 55 through a direct connection.

At step 310, the video display 55 may be powered on. For example, the user may power on the video display 55 by pressing a power button on the video display 55. As stated previously, the video display 55 is typically located in an ergonomically friendly location, such as a desktop. Advantageously, by using the method 300, the user may power on the IHS 5 by pressing the power button in an ergonomically friendly location, i.e., on the video display 55.

At step 320, the display controller 220 within the video display 55 may generate the HPD signal. In response to the user pressing the power button on the video display 55, the display controller 220 may receive a power-on signal for the video display 55 (e.g., monitor). The display controller 220 may then send the HPD signal to the IHS 5 over the direct connection. Accordingly, at step 330, the integrated graphics adapter 240 may receive the HPD signal.

At step 340, the integrated graphics adapter 240 may determine that the HPD signal is a response to a power-on signal for the video display 55. In one implementation, the integrated graphics adapter 240 may not determine that the HPD signal is a response to a power-on signal for the video display 55 when the power state for the IHS 5 is already S0. In other words, if the IHS 5 is already powered on, the method 300 may stop at step 330.

At step 350, the integrated graphics adapter 240 may request electric power for the IHS 5. The integrated graphics adapter 240 may send the request for electric power to the power switch 250. In turn, the power switch 250 may forward the request for electric power to the power controller 260. At step 360, the power controller 260 may power on the IHS 5 by changing the power state to S0.

Figure 4:
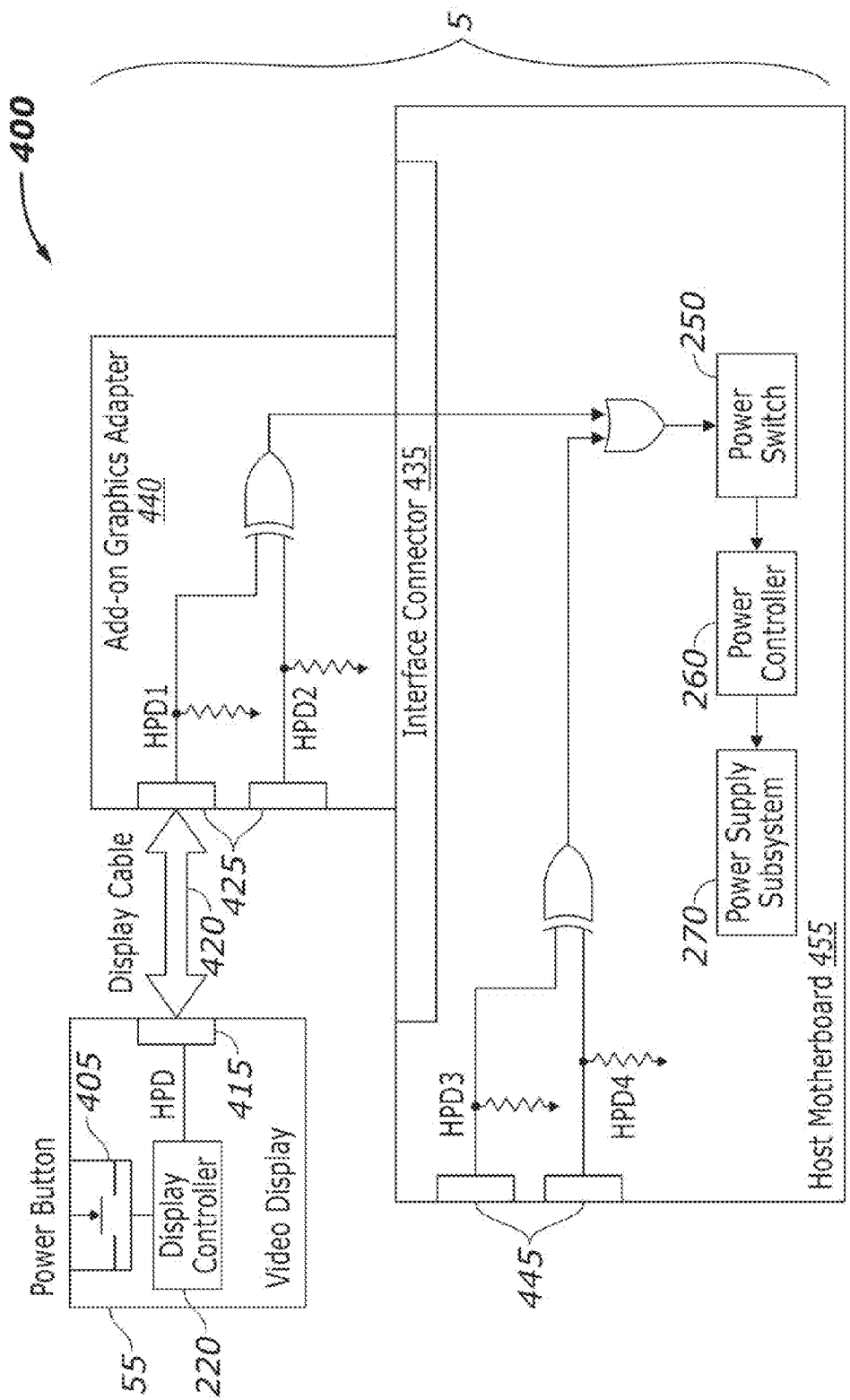
FIG. 4 represents a system for powering on the IHS in accordance with another aspect of the present disclosure.

FIG. 4 represents a system 400 for powering on the IHS 5 in accordance with another aspect of the present disclosure. The system 400 includes the IHS 5, coupled to the video display 55, over the display cable 420. The IHS 5 may include a host motherboard 455 and an add-on graphics adapter 440. The video display 55 may include a power button 405 and the display controller 220.

As shown, the add-on graphics adapter 440 may be coupled to the host motherboard 455 through an interface connector 435. In one implementation, the interface connector 435 may be a peripheral component interconnect (PCI) express connector. The host motherboard 455 may also include a power switch 250 and a power controller 260, described with reference to FIG. 2.

The display cable 420 may couple the video display 55 to the IHS 5 by coupling a monitor port 415 with one of a first set of ports 425 on the IHS. In one implementation, the monitor port 415 may be coupled to one of the first set of ports 425 for the add-on graphics adapter 440. Alternatively, the display cable 420 may couple the monitor port 415 with one of a second set of ports 445 for an integrated graphics adapter (not shown). The first set of ports 425 and second set of ports 445 are labeled HPD1, HPD2, HPD3 and HPD4, respectively, representing alternate power request signals (e.g., HPD signals) from the display controller 220 to the IHS 5.

In the system 400 for powering on the IHS 5, the display controller 220 may send the HPD signal to the add-on graphics adapter 440. The first set of ports 425 on the add-on graphics adapter 440 may be connected to a logic OR gate that may detect the HPD1 or HPD2 signal. The logic OR gate is used such that the HPD signal from any of the connected video displays can be detected. In response, the add-on graphics adapter 440 may determine that the HPD1 signal is a response to a power-on signal for the video display 55. Accordingly, the add-on graphics adapter 440 may send the power-on signal to the power switch 250. A logic OR gate on the host motherboard 455 may function similarly.

The power switch 250 on the host motherboard 455 may forward the power-on signal from the add-on graphics adapter 440 (or an integrated graphics adapter if one exists) to the power controller 260. In response to the power-on signal, the power controller 260 may change the power state to S0.

In one implementation, the logic OR gate may receive flea power when the IHS 5 is in power states S3, S4 or S5. Flea power may refer to the amount of power that the IHS may use to maintain functionality, such as local-area network connectivity. Typically, flea power associated with an IHS may be approximately 2.3 watts. In such an implementation, the add-on graphics adapter 440 may determine that the HPD1 signal is a response to a power-on signal for the video display 55 during power states S3, S4 or S5.

However, during power states S0, S1 or S2, the logic OR gate may receive power approximating 3.3 volts, in some implementations. In such a scenario, the 3.3 volts of power may mask the HPD1 signal. Accordingly, during power states S0, S1 and S2, the add-on graphics adapter 440 may not detect the HPD1 signal. Thus, the system 400 may not attempt to power on the IHS 5 when the IHS 5 is already powered on. The logic OR gate connecting the HPD3 and HPD4 signals on the host motherboard 455 may behave similarly to the logic OR gate on the add-on graphics adapter 440.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by a computer. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. A method for powering on an information handling system (IHS), comprising:
    receiving a hot plug detect signal from a video display in communication with the IHS, which video display is subject to being powered by a power-on signal, the hot plug detect signal received via a cable configured to carry display information from the IHS to the video display;
    determining that the hot plug detect signal is a response to the power-on signal for the video display received while the IHS is in a power state other than an S0 power state; and
    powering on the IHS in response to the determining the hot plug detect signal by sending a power request signal to a power controller of the IHS to bring the IHS to an S0 power state.

2. The method of claim 1, further comprising:
    powering on the video display and generating the hot plug detect signal;
    detecting the hot plug detect signal for the video display while the IHS is in a S3, S4, or S5 power state; and
    sending a power request signal to a power supply subsystem of the IHS.

3. The method of claim 1, wherein powering on the IHS further comprises changing a power state of the IHS to S0 from a power state of S3, S4, or S5.

4. The method of claim 1, wherein sending the power-on signal to the power controller of the IHS comprises:
    maintaining continuous power to a graphics adapter coupled to a motherboard of the IHS with an interface connector;
    sending the hot plug detect signal to the graphics adapter; and
    sending the power-on signal from the graphics adapter to the motherboard through the interface connector.

5. The method of claim 4, wherein the interface connector is a Peripheral Component Interconnect (PCI) Express connector.

6. The method of claim 1, wherein determining that the hot plug detect signal is a response to the power-on signal from the video display comprises receiving the hot plug detect signal which is of a duration lasting between 0.5 millisecond and 1 millisecond.

7. An information handling system (IHS) comprising:
    a video display in communication with the IHS via a cable configured to carry display information from the IHS to the video display;
    the video display being capable of generating a hot plug detect signal having a given duration when powered-on and communicating the hot plug detect signal via the cable;
    an add-on graphics adapter within the IHS to receive the hot plug detect signal from the video display;
    the graphics adapter having capacity to determine relative to the power state of the IHS that the hot plug detect signal is a response to a power-on signal for the video display; and
    a power switch, responsive to the graphics adapter, to power on the IHS by sending a power request signal to a power controller of the IHS.

8. The system of claim 7, wherein the graphics adapter is continuously powered on, and is further operable to:
    receive the hot plug detect signal for the video display; and
    send a power request signal to a power subsystem of the IHS if the IHS is in a S3, S4, or S5 power state.

9. The system of claim 7, wherein the IHS is powered on by changing a power state of the IHS from S3, S4, or S5 to S0.

10. The system of claim 7, further comprising a graphics adapter integrated with a motherboard of the IHS through an interface connector, which graphics adapter receives the hot plug detect signal of a duration lasting between 0.5 millisecond and 1 millisecond.

11. The system of claim 10, wherein the graphics adapter sends the power request signal to the motherboard through the interface connector.

12. The system of claim 7, further comprising supplying continuous power to the add-on graphics adapter.

13. The system of claim 12, wherein the interface connector is a peripheral component interconnect (PCI) express connector.

14. The system of claim 12, wherein the add-on graphics adapter sends the power request signal to the motherboard through the interface connector.

15. A method for powering on an information handling system (IHS), the method comprising:
    powering on a video display in communication with the IHS via a cable configured to carry display information from the IHS to the video display, wherein the IHS is in a power state of S3, S4, or S5;
    generating a hot plug detect signal in response to powering on the video display;
    sending the hot plug detect signal to a graphics adapter of the IHS via the cable;
    receiving by the IHS the hot plug detect signal from the video display;
    determining, by the graphics adapter, that the hot plug detect signal is a response to a power-on signal for the video display; and powering on the IHS by sending a power request signal to a power controller of the IHS as a response to determining that the hot plug detect signal is the response to the power-on signal for the video display.

16. The method of claim 15, wherein the graphics adapter is an add-on graphics adapter coupled to a motherboard of the IHS through an interface connector; and the add-on adapter is continuously powered while the IHS is in a power state S3, S4, or S5.

17. The method of claim 16, wherein sending the power request to the power controller of the IHS comprises:

sending the hot plug detect signal to the graphics adapter; and sending the power request signal from the graphics adapter to the motherboard through the interface connector only when the IHS is in a power state of S3, S4, or S5 when the hot plug detect signal is received.

18. The method of claim 16, wherein the interface connector is a peripheral component interconnect (PCI) express connector.

19. The method of claim 15, wherein the graphics adapter is integrated with a motherboard of the IHS.

20. The method of claim 15, further comprises maintaining continuous power to the graphics adapter when the IHS is in a power state of S3, S4, or S5.

* * * * *